United States Patent [19]
Liu et al.

[11] Patent Number: 6,115,155
[45] Date of Patent: Sep. 5, 2000

[54] SYSTEM FOR DEALING WITH FAULTS IN AN OPTICAL LINK

[75] Inventors: Jian-Yu Liu, Garland; Kuang-Yi Wu, Plano, both of Tex.

[73] Assignee: Chorum Technologies Inc., Richardson, Tex.

[21] Appl. No.: 09/190,078

[22] Filed: Nov. 12, 1998

Related U.S. Application Data

[63] Continuation-in-part of application No. 08/739,424, Oct. 29, 1996, Pat. No. 5,867,291.

[51] Int. Cl.[7] .............................. H04B 10/08; H04B 10/12
[52] U.S. Cl. .......................... 359/110; 359/124; 359/161; 370/228
[58] Field of Search ................................. 359/110, 161, 359/124, 127; 370/227, 228

[56] References Cited

U.S. PATENT DOCUMENTS

| | | | |
|---|---|---|---|
| 4,328,577 | 5/1982 | Abbott et al. | 370/84 |
| 4,919,522 | 4/1990 | Nelson | 350/389 |
| 5,081,452 | 1/1992 | Cozic | 340/825.01 |
| 5,121,244 | 6/1992 | Takasaki | 359/161 |
| 5,159,595 | 10/1992 | Flanagan et al. | 370/85.15 |
| 5,175,639 | 12/1992 | Takasaki | 359/118 |
| 5,343,464 | 8/1994 | Iino et al. | 370/16 |
| 5,363,228 | 11/1994 | DeJule et al. | 359/117 |
| 5,381,250 | 1/1995 | Meadows | 359/39 |
| 5,396,357 | 3/1995 | Goossen et al. | 359/119 |
| 5,414,541 | 5/1995 | Patel et al. | 359/39 |
| 5,434,691 | 7/1995 | Yamane | 359/117 |
| 5,457,556 | 10/1995 | Shiragaki | 359/117 |
| 5,488,500 | 1/1996 | Glance | 359/117 |
| 5,517,489 | 5/1996 | Ogura | 370/16.1 |
| 5,731,887 | 3/1998 | Fee | 359/110 |
| 5,777,761 | 7/1998 | Fee | 359/110 |
| 5,914,798 | 6/1999 | Liu | 359/161 |
| 6,021,113 | 1/1999 | Doshi et al. | 370/228 |
| 6,049,405 | 6/1999 | Oberg | 359/119 |

OTHER PUBLICATIONS

Ammann, "Synthesis of Electro–Optic Shutters having a Prescribed Transmission vs Voltage Characteristic," Journal of the Optical Society of America, vol. 56, No. 8, pp. 1081–1088 (Aug. 1966).

Harris et al., "Optical Network Synthesis Using Birefringent Crystals I. Synthesis of Lossless Networks of Equal–Length Crystals," Journal of the Optical Society of America, vol. 54, No. 10, pp. 1267–1279 (Oct. 1964).

*Primary Examiner*—Leslie Pascal
*Attorney, Agent, or Firm*—Dorr, Carson, Sloan & Birney, P.C.

[57] ABSTRACT

A system for dealing with faults in wavelength division multiplexed (WDM) optical communications between two terminals connected by at least two optical fibers monitors the status of communications over both optical fibers. If both optical fibers are operating normally, a first set of channels is routed over the first optical fiber and a second set of channels (which is mutually exclusive of the first set of channels) is routed over the second optical fiber. However, if a fault is detected in either optical fiber, the first terminal combines the first and second sets of channels and routes the combined channels over the remaining optical fiber to the second terminal. The second terminal separates the combined channels to recreate the first and second sets of channels. Wavelength slicers can be used to multiplex and demultiplex the channels at both terminals. This architecture allows the first and second sets of channels to be interdigitally spaced.

16 Claims, 8 Drawing Sheets

First Fault State

*Fig. 1*
*Normal Operation*

*Fig. 2*

*First Fault State*

Fig. 3

Second Fault State

SYSTEM FOR DEALING WITH FAULTS IN AN OPTICAL LINK

RELATED APPLICATIONS

The present application is a continuation-in-part of the Applicants' U.S. patent application Ser. No. 08/739,424, now U.S. Pat. No. 5,867,291 entitled "Programmable Wavelength Router", filed on Oct. 29, 1996.

BACKGROUND OF THE INVENTION

1. Field of the Invention

The present invention relates generally to the field of optical communications. More specifically, the present invention discloses a system for redirecting optical communications in response to a fault in an optical link.

2. Statement of the Problem

Optical wavelength division multiplexing has gradually become the standard backbone network for fiber optic communication systems. WDM systems employ signals consisting of a number of different wavelength optical signals, known as carrier signals or channels, to transmit information over optical fibers. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome, for example, multiplexing, demultiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. Demultiplexing is the opposite process in which a single WDM signal is decomposed into individual channels or sets of channels. The individual channels are spatially separated and coupled to specific output ports. Routing differs from demultiplexing in that a router spatially separates the input optical channels to output ports and permutes these channels according to control signals to create a desired coupling between an input channel and an output port.

Fiber optic communications networks are typically arranged with a plurality of terminals in any of a number of topological configurations. The simplest configuration is two terminals communicating data over an optical link. This can be extended to a daisy-chain configuration in which three or more terminals are connected in series by a plurality of optical links. Ring configurations are also used, as well as other two-dimensional networks. In each case, the optical link between two terminals typically includes a plurality of optical fibers for bidirectional communications, to provide redundancy in the event of a fault in one or more of the optical fibers, and for future capacity.

A fault in an optical fiber can be detected by the receiving terminal by sensing a loss of signal or severe degradation of signal power. Lesser defects in an optical link can be detected by monitoring the error rate in the received data. In any case, the conventional approach in responding to such faults has been to reroute the entire WDM signal from the faulty optical fiber to one of the unused optical fibers. This may also require rerouting the WDM signal through one or more intermediate nodes in the optical network. In ring configurations, one approach to responding to a fault has been to redirect communications in the opposite direction around the ring to avoid the faulty segment of the ring.

Another approach has been to reroute the WDM signal from the faulty optical fiber to a second optical fiber that has degree of unused capacity. For example, the interrupted signal can be translated to an unused frequency band and transmitted over a second optical fiber using a frequency-division multiplexing scheme. Similarly, the interrupted signal can be assigned to unused time slots and transmitted over a second optical fiber using a time-division multiplexing scheme. All of these prior art approaches require significant overhead to dynamically allocate unused fibers, frequencies, and/or time slots, and then reroute the signals to the appropriate fibers.

3. Other Related Art

The Applicants' U.S. Pat. Nos. 5,724,165 and 5,694,233, and U.S. patent application Ser. No. 08/739,424 teach two methods for high performance signal routing (U.S. Pat. No. 5,724,165) and wavelength demultiplexing (Ser. No. 08/739,424 and U.S. Pat. No. 5,694,233). In U.S. Pat. No. 5,724,165, new structures for realizing optical switches (routers) were disclosed that achieve very high extinction ratios. However, these switches are wavelength independent. In Ser. No. 08/739,424 and U.S. Pat. No. 5,694,233, optical systems are disclosed to provide the functions of wavelength demultiplexing and routing.

Other related art in the field includes the following:

| Inventor | Patent No. | Issue Date |
| --- | --- | --- |
| Fee | 5,777,761 | July 7, 1998 |
| Fee | 5,731,887 | Mar. 24, 1998 |
| Ogura | 5,517,489 | May 14, 1996 |
| Glance | 5,488,500 | Jan. 20, 1996 |
| Shiragaki | 5,457,556 | Oct. 10, 1995 |
| Yamane | 5,434,691 | July 18, 1995 |
| Patel et al. | 5,414,541 | May 9, 1995 |
| Goosen et al. | 5,396,357 | Mar. 7, 1995 |
| Meadows | 5,381,250 | Jan. 10, 1995 |
| DeJule et al. | 5,363,228 | Nov. 9, 1994 |
| Iino et al. | 5,343,464 | Aug. 30, 1994 |
| Flanagan et al. | 5,159,595 | Oct. 27, 1992 |
| Cozic | 5,081,452 | Jan. 14, 1992 |
| Nelson | 4,919,522 | Apr. 24, 1990 |

Ammann, "Synthesis of Electro-Optic Shutters having a Prescribed Transmission vs Voltage Characteristic," *Journal of the Optical Society of America*, vol. 56, no. 8, pp. 1081–1088 (August 1966)

Harris et al., "Optical Network Synthesis Using Birefringent Crystals I. Synthesis of Lossless Networks of Equal-Length Crystals," *Journal of the Optical Society of America*, vol. 54, no. 10, pp. 1267–1279 (Oct. 1964)

U.S. Pat. Nos. 5,777,761 and 5,731,887 (Fee) disclose an optical communications system in which a controller reroutes the signal through a protection link in the event of link failure. If necessary, the controller can reroute the signal through a frequency translator.

Ogura discloses a bidirectional optical ring in which channels (i.e., time slots) are dynamically allocated.

Glance discloses a tunable add/drop filter using a 1×N optical switch, a wavelength grating router (WGR), and a multiplexer. The WGR outputs include a set of retain outputs that are coupled directly to the multiplexer and a drop output. The particular WDM frequency component that is routed to the drop output is determined by the WGR input port at which the WDM signal is received. The 1×N switch provides the WDM signal to the proper WGR input so that a selected frequency is provided to the drop output. The retained signals and any added signals are multiplexed by the multiplexer.

Shiragaki discloses an optical cross-connect system using space and wavelength division switching to remedy faults in a optical communications network.

Yamane discloses an example of an optical communications system that uses time multiplexing for protection.

Patel et al. disclose an optical switch using a series of birefringent layers and ferro-electric cells to route an input beam to any of a plurality of output positions.

Goosen et al. disclose a ring configuration with a single optical fiber in which optical signals of two discrete wavelengths are transmitted in opposite directions over the ring. This ensures that each of the nodes on the ring will receive identical data irrespective of any single point failure in the ring.

Meadows discloses a 2×2 electro-optical switch that employs dielectric film polarizing beamsplitters and a switchable electro-optic retarder.

DeJule et al. disclose an optical switching device using a plurality of polarization-independent switching cells arranged in matrix form. Each switching cell consists of a spatial light modulator and a number of polarized beamsplitters that can be used to selectively direct an input optical beam along either of two axes.

Iino et al. disclose a switching system that includes a protection switch that operates to switch a working transmission line to a protection transmission line using time multiplexing.

Flanagan et al. and Cozic disclose ring communications systems in which signals are rerouted in the opposite direction in the event of a fault.

Nelson discloses an optical switch employing an electro-optical crystal that exhibits birefringence in each of two different light paths when the crystal is disposed in orthogonally-oriented electric fields. Each light path is sensitive to a different one of the two electric fields and has its own set of fast and slow axes.

Ammann and Harris et al. provide general background in the field of optical filter design.

4. Solution to the Problem

None of the references discussed above show the present system for automatically multiplexing and redirecting WDM signals in the event of a fault in the optical link between two terminals. Under normal operating conditions in the present invention, the WDM signals are transmitted as two separate, mutually exclusive sets of channels over two optical fibers between the terminals. For example, the two sets of channels can be interdigitally spaced. If a fault is detected in one optical fiber, the transmitting terminal combines both sets of channels and routes the combined channels over a second optical fiber that does not have a fault. The receiving terminal demultiplexes the combined channels to recreate the first and second sets of channels for further transmission over additional links in the optical network.

SUMMARY OF THE INVENTION

This invention provides a system for dealing with faults in wavelength division multiplexed (WDM) optical communications. Two terminals are connected by at least two optical fibers and the status of communications over both optical fibers is monitored. If both optical fibers are operating normally, a first set of channels is routed over the first optical fiber and a second set of channels (which is mutually exclusive of the first set of channels) is routed over the second optical fiber. However if a fault is detected in either optical fiber, the first terminal combines the first and second sets of channels and routes the combined channels over the remaining optical fiber to the second terminal. The second terminal separates the combined channels to recreate the first and second sets of channels. Wavelength slicers can be used to multiplex and demultiplex the channels at both terminals. This architecture allows the first and second sets of channels to be interdigitally spaced. These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
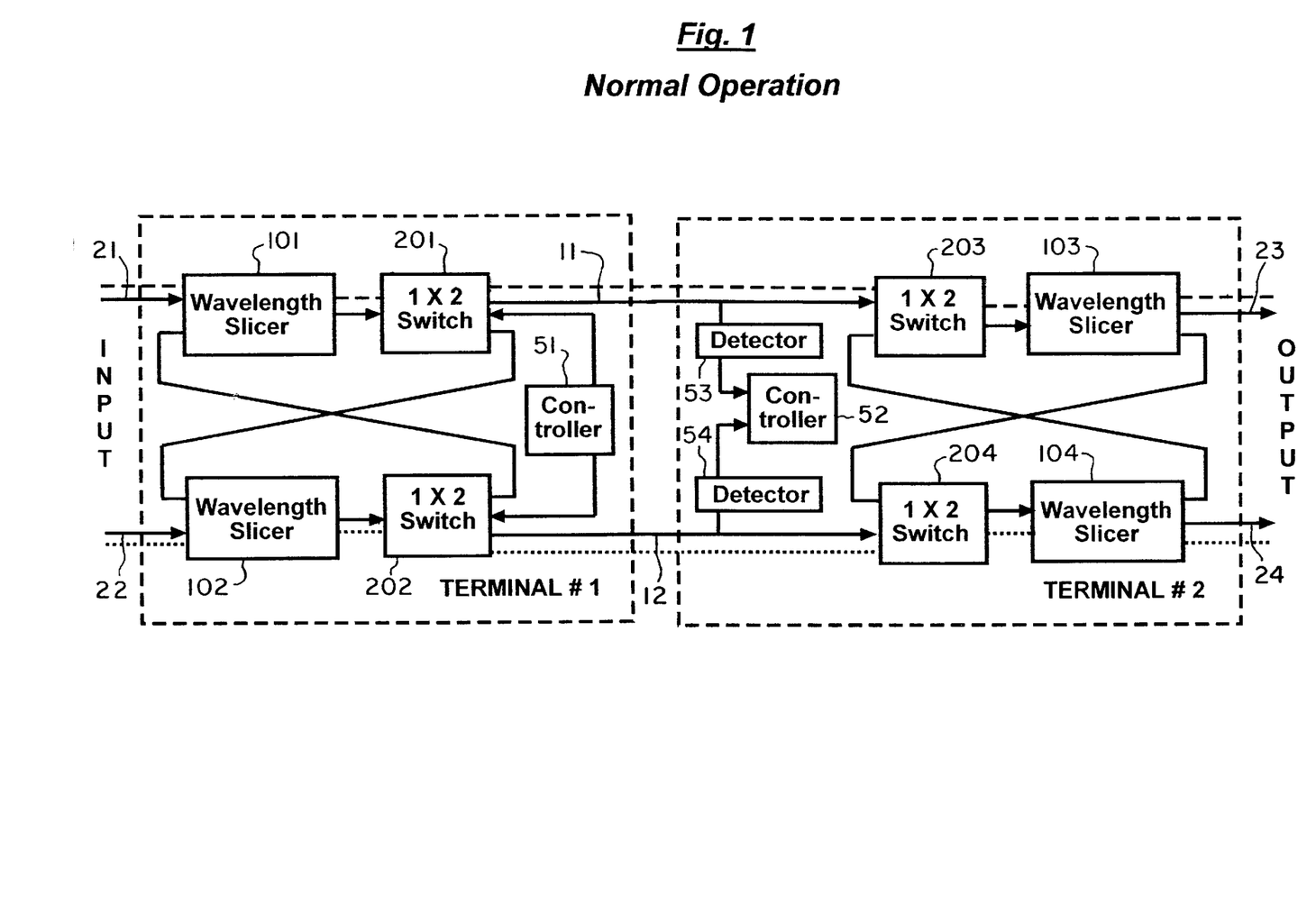
FIG. 1 is a schematic block diagram of the overall optical communications system in normal operation.
Figure 2:
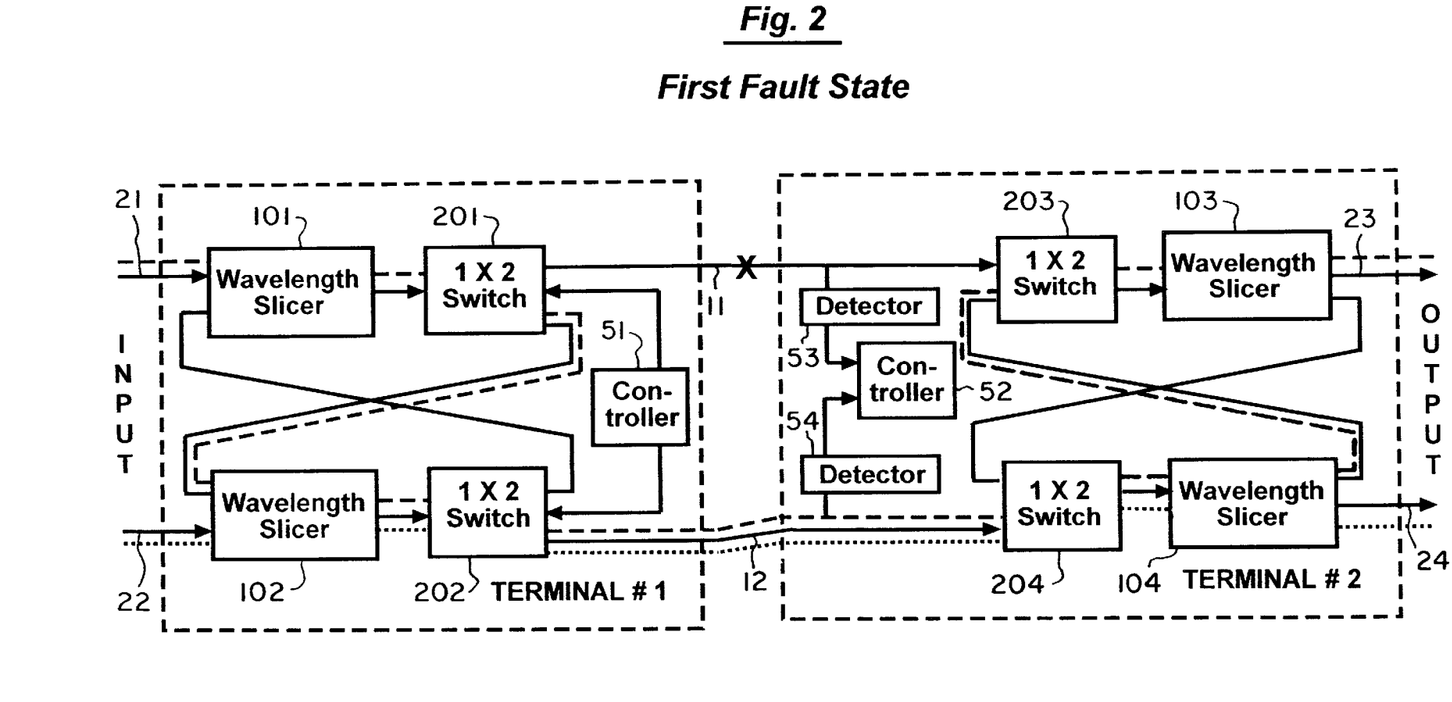
FIG. 2 is a schematic block diagram of the optical communications system in a first fault state, in which the first optical fiber has a fault.
Figure 3:
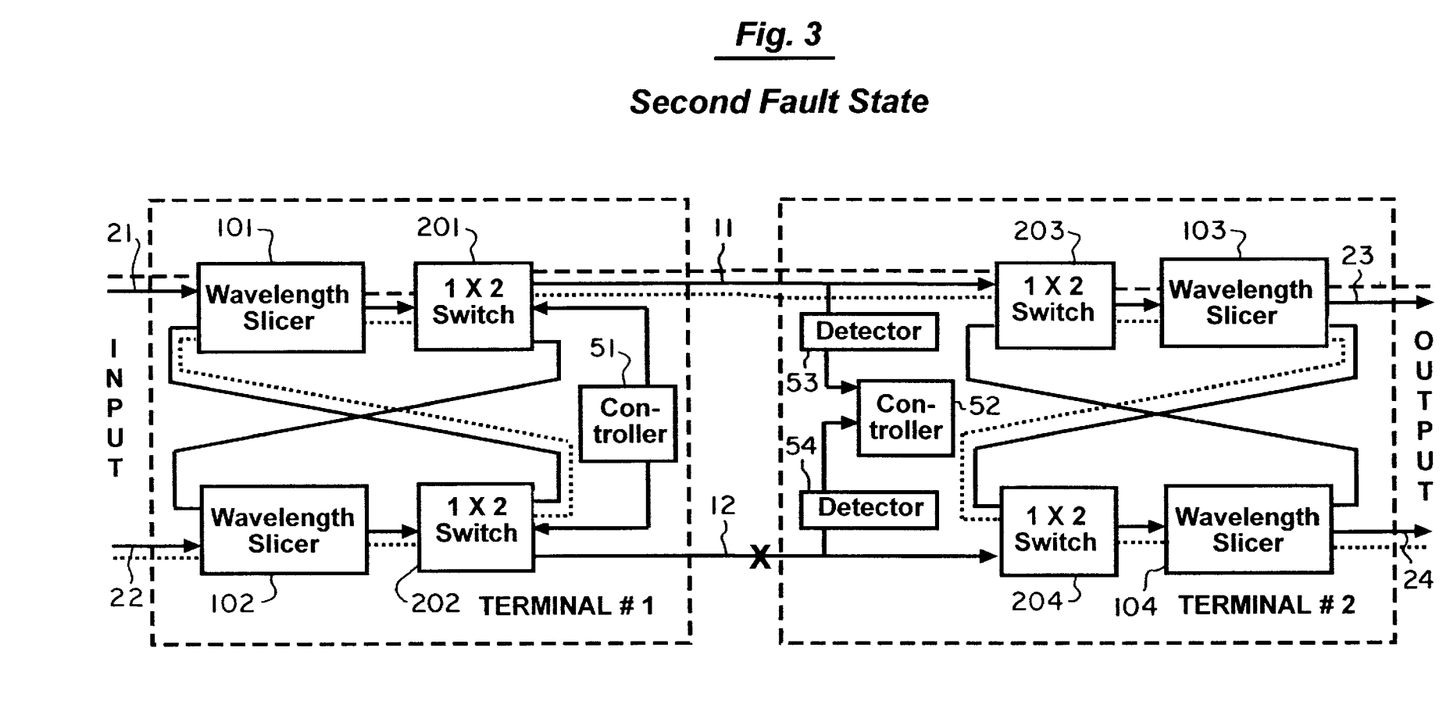
FIG. 3 is a schematic block diagram of the optical communications system in a second fault state, in which the second optical fiber has a fault.

FIGS. 1–3 are schematic diagrams illustrating the three modes of operation of one embodiment of the present invention. As an overview of these figures, terminal 1 receives input WDM signals from input port 21 and 22 and transmits these WDM signals over at least two optical fibers 11 and 12 to terminal 2. Terminal 2 outputs these sets of WDM signals at output ports 23 and 24. The terminals 1, 2 and optical fibers 11, 12 can provide point-to-point communications, or they can be one link in a larger optical communications network. For example, the terminals 1, 2 and optical fibers 11, 12 can be a link in a series of optical links.

Figure 6:
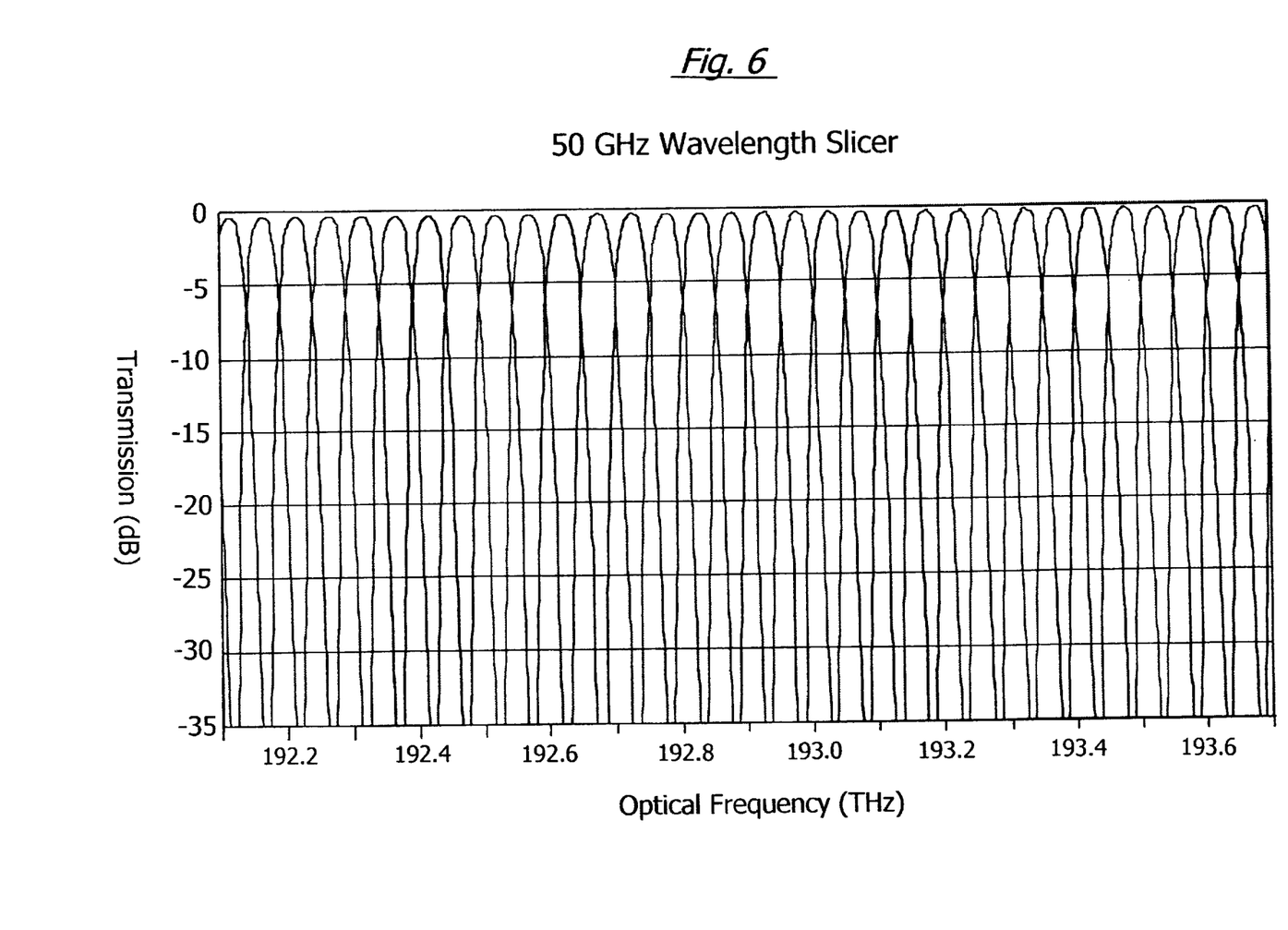
FIG. 6 is a spectral diagram of the transmission function of a wavelength slicer for separating adjacent 50 GHz input channels into two sets of output channels.

A WDM signal consists of multiple channels with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. For example, the wavelength slicers shown in FIGS, 1–3 and 4 can separate channels based on a 50 GHz spacing between adjacent channels, as depicted in FIG. 6. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

Figure 4:
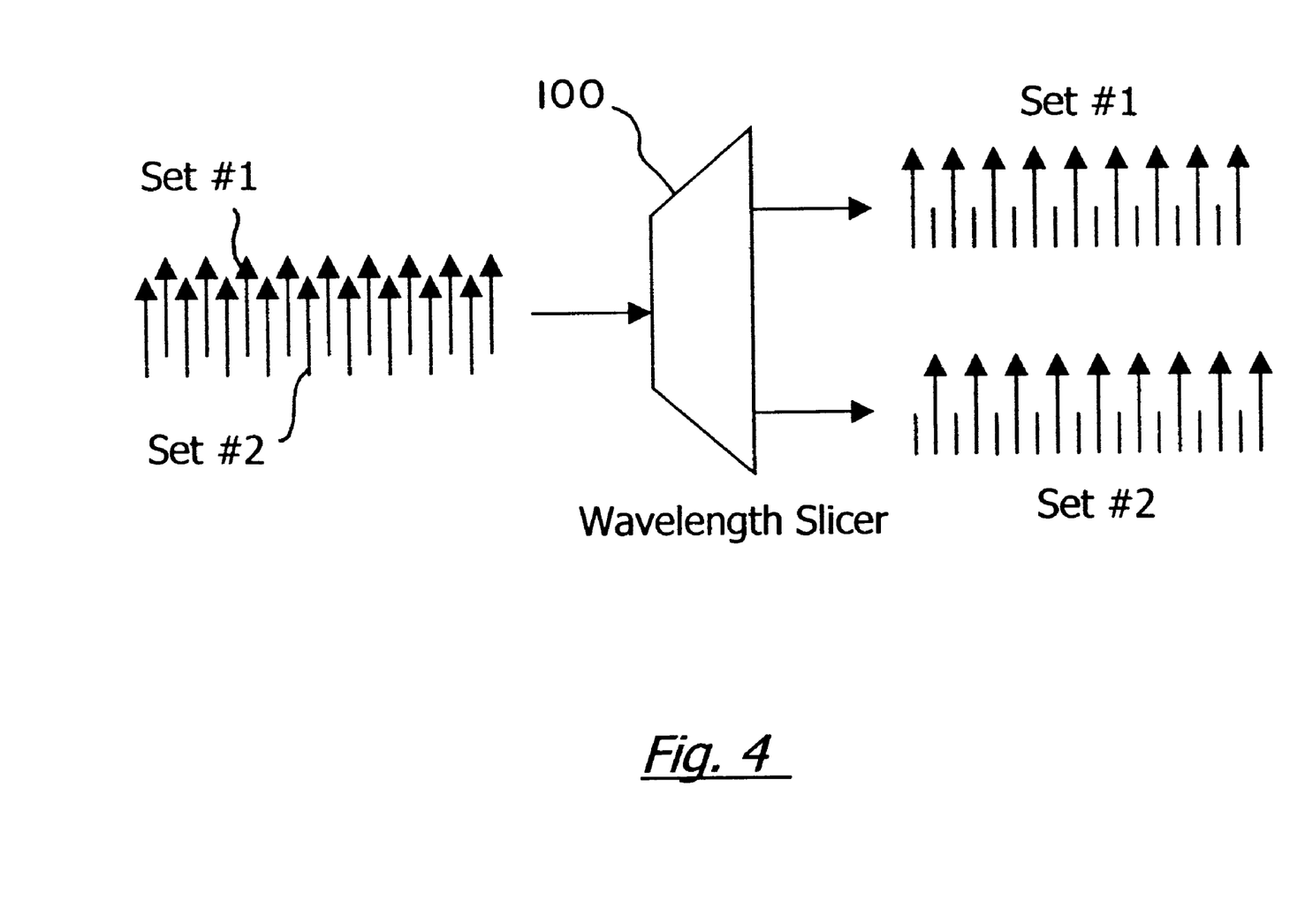
FIG. 4 is a simplified block diagram illustrating the functionality of a wavelength slicer.

Returning to FIGS. 1–3, normal operation of the present system is illustrated in FIG. 1. A first set of input WDM channels are received by terminal 1 at input port 21 and a second set of input channels are received at input port 22. The first and second sets of channels are mutually exclusive, in that there is no overlap in the frequency bands assigned to channels in the two sets. In the preferred embodiment of the present invention, the first and second sets of channels are interdigitally spaced as shown in FIG. 4. For example, the spacing between adjacent channels in the first set can be 100 GHz, and the spacing between adjacent channels in the second set can be 100 GHz. The resulting interdigital spacing between channels after the first and second sets are combined would be 50 GHz.

FIG. 4 is a block diagram illustrating the general functionality of an individual wavelength slicer 100 as a component in the overall system shown in FIGS. 1–3. The input WDM signal is coupled using conventional optical signal coupling techniques to the input port of the wavelength slicer 100. The wavelength slicer 100 separates the input signal into two sets of channels, which are routed to the output ports as depicted in FIG. 4. In the preferred embodiment, the wavelength slicer 100 separates alternating adjacent input channels into the first and second sets of output channels. FIG. 6 illustrates the transmission characteristics of a wavelength slicer with a channel spacing of 50 GHz. Each wavelength slicer 100 is inherently bidirectional, and therefore can be used interchangeably either to separate (or demultiplex) an input signal into two sets of output channels, or to combine (or multiplex) two sets of input channels into a combined output WDM signal. The details of the structure and operation of one possible implementation of a wavelength slicer are discussed more fully below with regard to FIG. 5.

In FIGS. 1–3, the wavelength slicers 101 and 102 in terminal 1 are arranged to combine (or multiplex) any WDM signals received at their respective input ports (shown on the left side of wavelength slicers 101, 102). The output port of each wavelength slicer 101, 102 is connected to a 1×2 optical routing switch 201, 201. The states of both 1×2 switches are controlled by a controller 51. These 1×2 switches route the output WDM signals from the wavelength slicers 101, 102 either to the optical fibers 11, 12 or the input port of the opposite wavelength slicer 102, 101 depending on the control state of the system, as will be described below in greater detail. The details of the structure and operation of one possible embodiment of a 1×2 optical routing switch is discussed below with regard to FIGS. 7 and 8.

The inverse process occurs at the receiving terminal 2. Wavelength slicers 103 and 104 separate (or demultiplex) the received channels to recreate the first and second sets of channels. Detectors 53, 54 monitor the received WDM signals to determine whether faults have occurred in either of the optical fibers 11, 12. If a fault is detected, the controller 52 switches the control state of the 1×2 optical routing switches 203 and 204 to route the WDM signals to the appropriate wavelength slicers 103, 104 for demultiplexing, as will be described in greater detail below. The fault state is also communicated upstream to the controller 51 for the first terminal 1 (e.g., via a separate optical link, not shown), so that its 1×2 optical routing switches will be appropriately configured.

FIG. 1 illustrates the normal operational state of the present system in which both of the optical fibers 11, 12 are operating normally (i.e., without faults). At terminal 1, a first set of channels are input at the first input port of wavelength slicer 101, and a second set of channels are input at the second input port of wavelength slicer 102. Optical switch 201 routes the output WDM signal (i.e., the first set of channels) from wavelength slicer 101 to the first optical fiber 11. Similarly optical switch 202 routes the output WDM signal (i.e., the second set of channels) from wavelength slicer 102 to the second optical fiber 12. At terminal 2, optical switch 203 routes the WDM signal received over optical fiber 11 (i.e., the first set of channels) to the input port of wavelength slicer 103. Due to its transmission characteristics, all of the first set of channels are output to the first output port 23 of the wavelength slicer 103, and none are routed from the second output port of wavelength slicer 103 to optical switch 204. Similarly, optical switch 204 routes the WDM signal received over optical fiber 12 (i.e., the second set of channels) to the input port of wavelength slicer 104. All of the second set of channels are output to the second output port 24 of the wavelength slicer 104, as shown in FIG. 1.

FIG. 2 depicts the first fault state in which the first optical fiber 11 is faulty. For example, this state can be identified by loss of received signal at detector 53. In response, controller 52 changes the control state of optical switch 203 in terminal 2, and controller 51 changes the control state of optical switch 201 in terminal 1, as shown in FIG. 2. As a result of this switching configuration, the output WDM signal from wavelength slicer 101 (i.e., the first set of channels) is routed by optical switch 201 to the first input port of wavelength slicer 102, which combines it with the second set of channels input at the second input port 22 of wavelength slicer 102. The combined channels output by wavelength slicer 102 are routed by optical switch 202 over the second optical fiber 12 to terminal 2.

At terminal 2, the multiplexing process is reversed to recreate the first and second sets of channels. The combined sets of channels are received over optical fiber 12 by optical switch 204 and wavelength slicer 104. Wavelength slicer 104 separates the combined channels into the first set of channels, which is output at its first output port, and the second set of channels, which is output at its second output port 24. The first set of channels is routed by optical switch 203 to the input port of wavelength slicer 103, which in turn outputs the first set of channels at its first output port 23, as shown in FIG. 2.

FIG. 3 shows the second fault state in which the second optical fiber 12 is faulty. This state can be identified by loss of received signal at detector 54 in terminal 2. Controller 52 changes the control state of optical switch 204 in terminal 2, and controller 51 changes the control state of optical switch 202 in terminal 1, as shown in FIG. 3. As a result of this switching configuration, the output WDM signal from wavelength slicer 102 (i.e., the second set of channels) is routed by optical switch 202 to the second input port of wavelength slicer 101, which combines it with the first set of channels input at the first input port 21 of wavelength slicer 101. The combined channels output by wavelength slicer 101 are routed by optical switch 201 over the first optical fiber 11 to terminal 2.

At terminal 2, the combined channels are received over optical fiber 11 by optical switch 203 and wavelength slicer 103. Wavelength slicer 103 separates the combined channels into the first set of channels, which is output at its first output port 23, and the second set of channels, which is output at its second output port. The second set of channels is routed by optical switch 204 to the input port of wavelength slicer 104, which in turn outputs the second set of channels are its second output port 24, as shown in FIG. 3.

The present invention can be extended, if desired, to handle more than two optical fibers between terminals. For example, three mutually exclusive sets of channels can be assigned to each of three optical fibers. If one or two of these optical fibers develop a fault, either two or all three of the sets of channels can be combined and transmitted over the remaining optical fibers to the receiving terminal. The receiving terminal can then demultiplex the combined channels, as previously described, to recreate all three sets of channels.

The preceding discussion has assumed that the first and second sets of channels are interdigitally spaced, as shown in FIG. 4. However, other channel configurations could be employed, as long as there are at least two mutually exclusive sets of channels. For example, alternating blocks of channels could be used to define the first and second sets of channels.

Other types of frequency multiplexers and demultiplexers could be readily substituted in place of the wavelength slicers 101–104 shown in FIGS. 1–3. For example, a set of polarization rotators and a polarized beamsplitter can be used to combine the first and second sets of channels, in place of wavelength slicers 101 and 102 in terminal 1. Demultiplexing can be accomplished by filters or diffraction gratings, although such approaches would tend to be less efficient and more expensive.

Wavelength Slicer.

Figure 5:
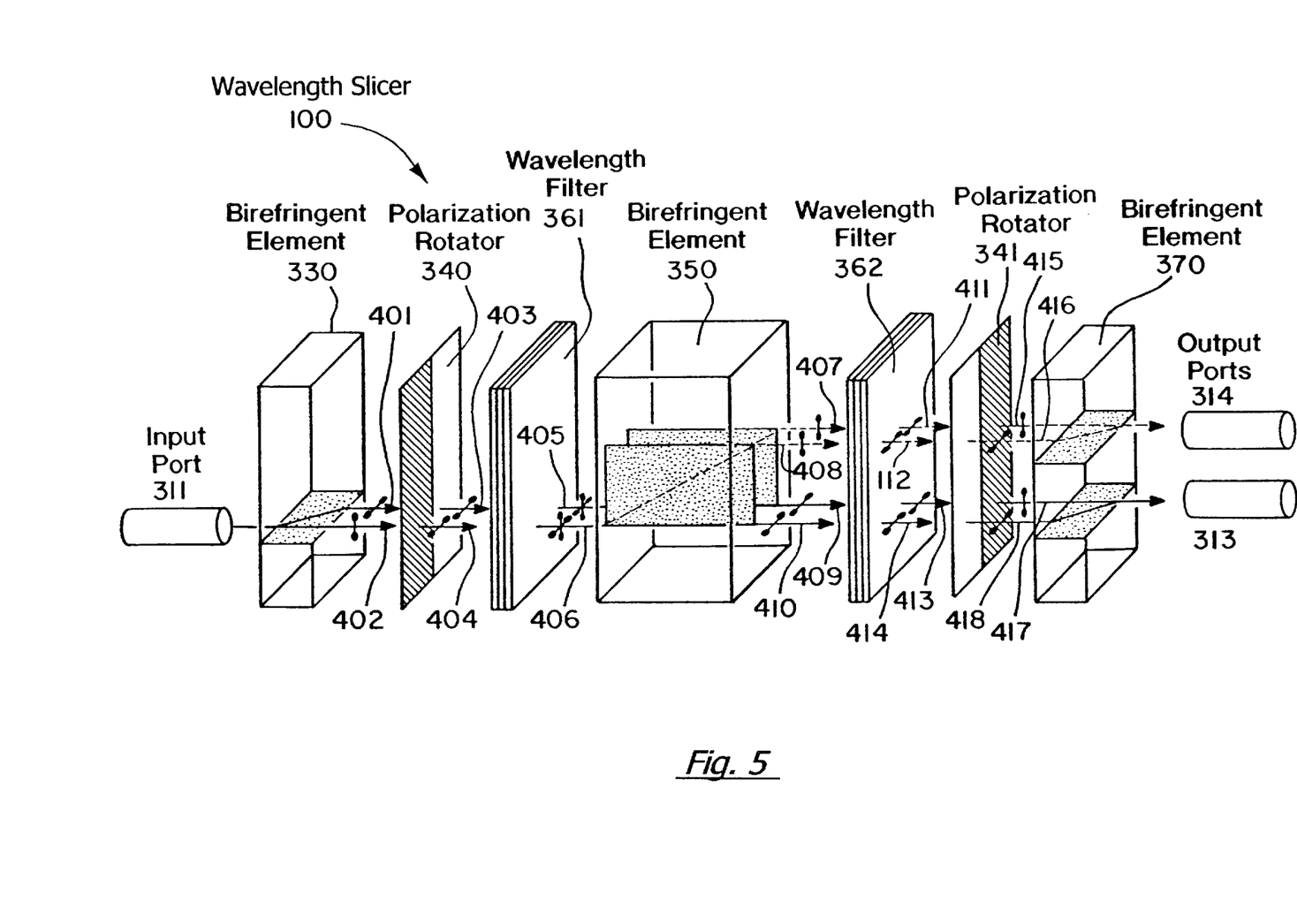
FIG. 5 is a schematic block diagram of a wavelength slicer.

FIG. 5 is a detailed schematic diagram of a wavelength slicer 100. Each of the optical paths is labeled with either a horizontal double-headed line indicating horizontal polarization, or a vertical double-headed line indicating vertical polarization, or both horizontal and vertical double-headed lines indicating mixed horizontal and vertical polarizations in the optical signal at that point.

The input signal 311 enters the first birefringent element 330 that spatially separates horizontal and vertically polarized components of the input signal. The first birefringent element 330 consists of a material that allows the vertically polarized portion of the optical signal to pass through without changing course because they are ordinary waves in the birefringent element 330. In contrast, horizontally-polarized waves are redirected at an angle because of the birefringent walk-off effect. The angle of redirection is a well-known function of the particular materials chosen. Examples of materials suitable for construction of the birefringent element include calcite, rutile, lithium niobate, $YVO_4$-based crystals, and the like. The horizontally-polarized component travels along a path 401 as an extraordinary signal in the first birefringent element 330 while the vertically polarized component 402 travels as an ordinary signal and passes through without spatial reorientation. The resulting signals 401 and 402 both carry the full frequency spectrum of the input signal 311.

At least one of the beam components 401 and 402 are coupled to a polarization rotator 340 which selectively rotates the polarization state of either beam component 401 or 402 by a predefined amount. In the preferred embodiment, the rotator 340 rotates the signals by either 0° (i.e., no rotation) or 90°. In FIG. 5, the vertically-polarized component 402 is rotated by 90° so that both signals 403, 404 exiting the polarization rotator 340 have a horizontal polarization. Again, at this stage, both the horizontal and vertical components 402, 403 contain the entire frequency spectrum of channels in the input WDM signal 311.

The stacked waveplates element 361 is a stacked plurality of birefringent waveplates at selected orientations that generate two eigen states. The first eigen state carries a first set of channels with the same polarization as the input, and the second eigen state carries a complementary set of channels at the orthogonal polarization. The polarization of the incoming beam and the two output polarizations form a pair of spectral responses, where (H, H) and (V, V) carry the first set of channels from the input spectrum and (H, V) and (V, H) carry the complementary (second) set of channels of the input spectrum, where V and H are vertical and horizontal polarization, respectively. With horizontal polarizations 403, 404 input to the first stacked waveplates element 361 as illustrated in FIG. 5, orthogonal vertical and horizontal polarizations are generated with the first set of channels residing in horizontal polarization and the second set of channels residing in vertical polarization.

Returning to FIG. 5, the pairs of optical responses 405, 406 output by the first stacked waveplates element 361 are coupled to a second birefringent element 350. This birefringent element 350 has a similar construction to the first birefringent element 330 and spatially separates the horizontally and vertically polarized components of the input optical signals 405 and 406. As shown in FIG. 5, the optical signals 405, 406 are broken into vertically-polarized components 407, 408 containing the second set of channels and horizontally-polarized components 409, 410 containing the first set of channels. Due to the birefringent walk-off effect, the two orthogonal polarizations that carry first set of channels 409, 410 in horizontal polarization and second set of channels 407, 408 in vertical polarization are separated by the second birefringent element 350.

Following the second birefringent element 350, the optical elements on the input side of the second birefringent element 350 can be repeated in opposite order, as illustrated in FIG. 5. The second stacked waveplates element 362 has substantially the same composition as the first stacked waveplates element 361. The horizontally-polarized beams 409, 410 input to the second stacked waveplates element 362, are further purified and maintain their polarization when they exit the second stacked waveplates element 362. On the other hand, the vertically-polarized beams 407, 408 experience a 90° polarization rotation and are also purified when they exit the second stacked waveplates element 362. The 90° polarization rotation is due to the fact that the vertically-polarized beams 407, 408 carry the second set of channels and are in the complementary state of stacked waveplates element 362. At the output of the stacked waveplates element 362, all four beams 411, 412 and 413, 414 have horizontal polarization. However, the spectral bands defined by the filter characteristics of the stacked waveplates elements 361, 362 are separated with the second set of channels on top and the first set of channels below.

To recombine the spectra of the two sets of beams 411, 412 and 413, 414, a second polarization rotator 341 and a third birefringent element 370 are used. The second rotator 341 intercepts at least two of the four parallel beams 411–414 and rotates the polarization of the beams to produce an orthogonally-polarized pair of beams 415, 416 and 417, 418 for each spectral band at the output of the second polarization rotator 341. In the case of FIG. 5, the polarization of beams 411 and 413 is rotated by 90°, and beams 412 and 414 are passed without change of polarization. Finally, a third birefringent element 370 recombines the two orthogonally-polarized beam pairs 415, 416 and 417, 418 using the walk-off effect to produce two sets of channels that exit at the output ports 314 and 313, respectively.

1×2 Optical Routing Switch

Figure 7:
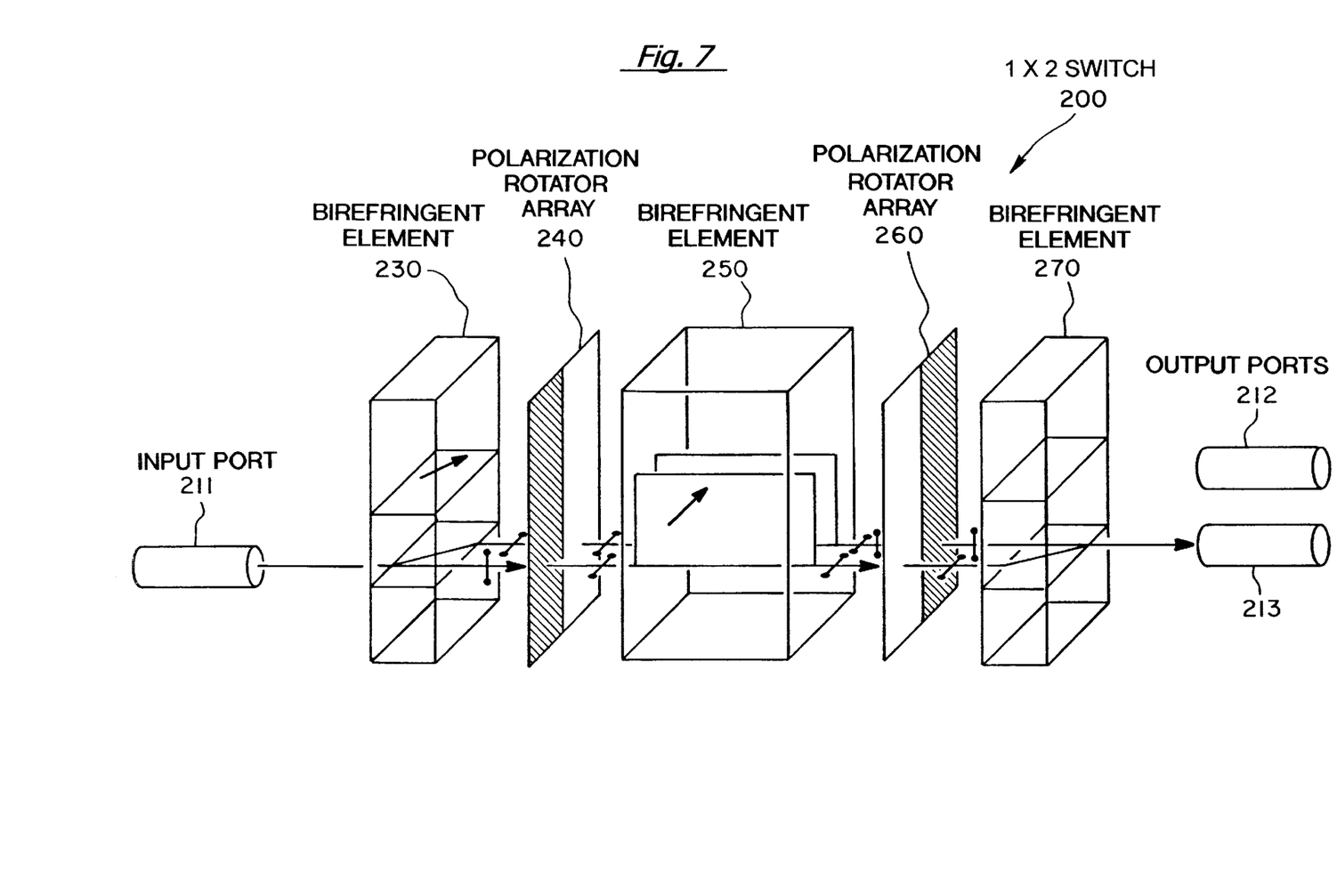
FIG. 7 is a schematic block diagram of a 1×2 optical routing switch in a first control state.
Figure 8:
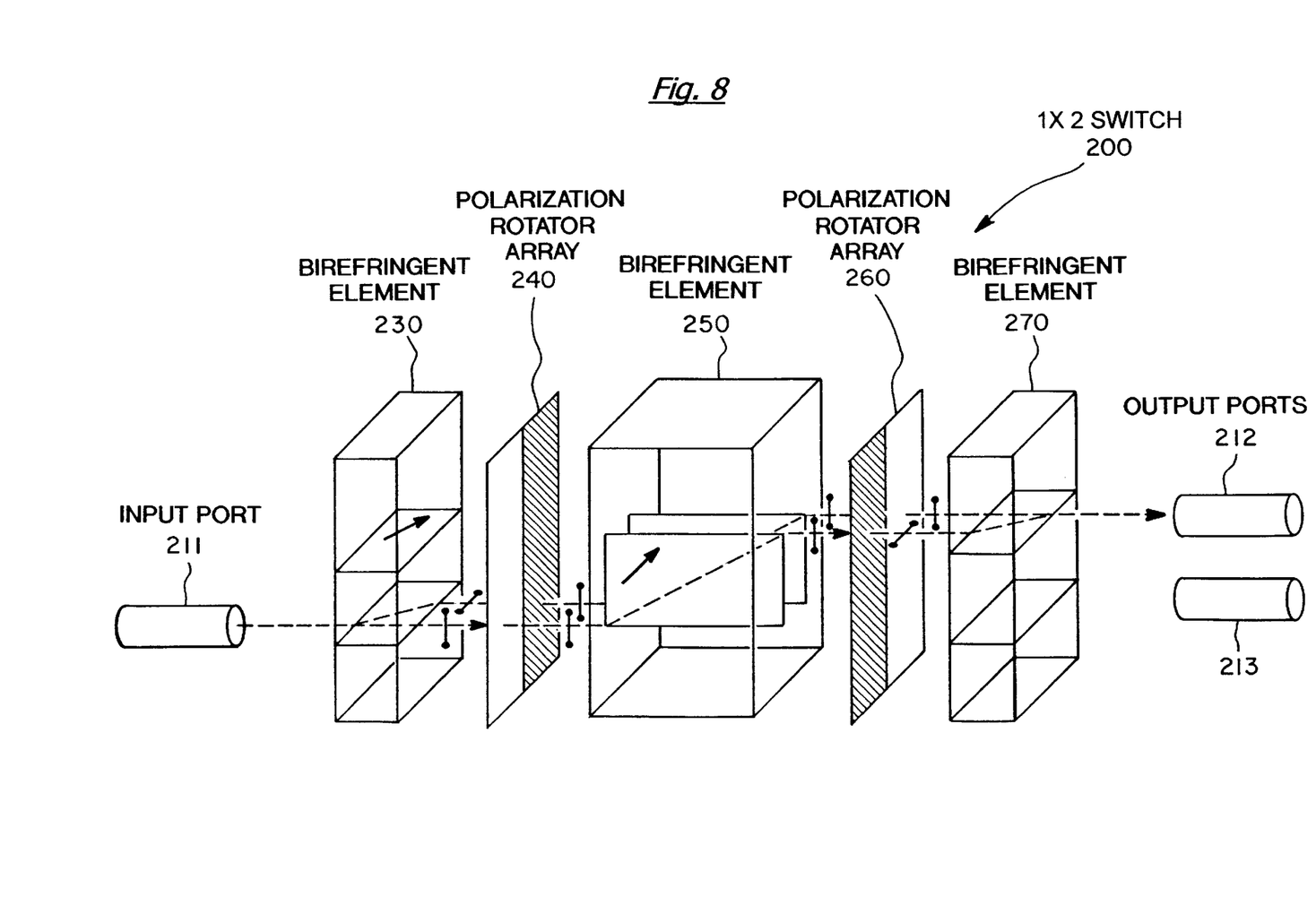
FIG. 8 is a schematic block diagram of a 1×2 optical routing switch in its second control state.

FIGS. 7 and 8 show schematic diagrams of a 1×2 optical routing switch 200 in accordance with the present invention in both of its control states. The switch 200 comprises a optical input/output port 211 that receives an optical signal from, for example, an optical fiber (not shown). The optical signal is controllably routed to one of optical outputs 212 and 213 that serve to launch the switched signal into other optical fibers (not shown).

An optical signal enters switch 200 through port 211 and is split into two orthogonal polarizations by birefringent element 230. The optic axis of birefringent element 230 is oriented obliquely to the light beam propagation such that the optical signal is decomposed into a pair of orthogonally-polarized parallel beams upon exiting the birefringent element 230. Facets of the birefringent crystals used to form birefringent element 230 can be, but are not required to be, normal to the propagation direction of the light beams. The birefringent element 230 comprises a material that allows the vertically polarized portion of the optical signal to pass through without changing course because they are ordinary waves in the birefringent element 230. In contrast, horizontally polarized waves are redirected at an angle because of the birefringent walk-off effect. The angle of redirection is a well-known function of the particular materials chosen.

A polarization converter 240 is divided into two sub-elements such as right and left halves shown in FIGS. 7 and 8. These two sub-elements are configured such that one is on (indicated by cross-hatching) and one is off. This arrangement causes both beams to become either vertically polarized (shown in FIG. 8) or horizontally polarized (shown in FIG. 7) at the exit of polarization converter 240.

The second birefringent element 250 comprises a similar material to the first birefringent element 230 in the particular example of FIGS. 7 and 8. The second birefringent element 250 is oriented such that its polarization eigen plane is perpendicular to that of the first birefringent element 230. Because both beams entering the second birefringent element 250 have identical polarization, both either pass through undisturbed (FIG. 7) or both are redirected upward (FIG. 8). The physical size of element 250 determines the amount of redirection that occurs.

The two beams exiting the second birefringent element 250 enter a second polarization rotator array 260. This polarization rotator array 160 comprises two sub-elements similar to the first rotator array 240 discussed above to accommodate the two pairs of possible light paths exiting the second birefringent element 250 seen by comparing FIGS. 7 and 8. The second polarization rotator array 260 is controlled such that the on/off states are opposite or complementary of the on/off states of the first polarization rotator array 240. This complementary arrangement causes each of the optical signal portions leaving second polarization rotator array 260 to have a polarization opposite that which existed prior to entering the first polarization rotator array 240.

The third birefringent element 270 comprises a material and construction similar to the birefringent elements 230 and 250 discussed before. The third birefringent element 250 is oriented such that its polarization eigen plane is parallel to that of the first birefringent element 230, and perpendicular to that of the second birefringent element 250. The final birefringent element 270 serves to recombine the two optical signal portions into a single signal that is aligned either with output port 213 (FIG. 7) or output port 212 (FIG. 8), depending upon the control state of the 1×2 optical routing switch 200.

Because each of elements 230, 240, 250, 260, and 270 are bi-directional devices, the entire 1×2 optical routing switch 200 performs identically in both directions. In other words, ports 212 and 213 could be employed as inputs to propagate signals into port 211, such that the 1×2 optical routing switch 200 serves to select which signal is coupled to port 211 at any given time.

The above disclosure sets forth a number of embodiments of the present invention. Other arrangements or embodiments, not precisely set forth, could be practiced under the teachings of the present invention and as set forth in the following claims.

We claim:

1. A method for optical communications from a first terminal to a second terminal over a first optical fiber and a second optical fiber using wavelength division multiplexed (WDM) signals containing a plurality of channels, said method comprising:

monitoring the status of said first optical fiber to define a normal state in which the first optical fiber is operating normally, and a fault state in which the first optical fiber has a fault;

in said normal state, routing a first set of channels over the first optical fiber and routing a second set of channels over the second optical fiber, wherein said first set of channels and said second set of channels are mutually exclusive; and in said fault state:
 (a) combining said first and second sets of channels at the first terminal;
 (b) routing the combined channels over the second optical fiber to the second terminal; and
 (c) separating the combined channels at the second terminal into said first and second sets of channels.

2. The method of claim 1 wherein said first set of channels and said second set of channels are interdigitally spaced.

3. The method of claim 1 wherein said step of combining said first and second sets of channels at said first terminal is performed by at least one wavelength slicer.

4. The method of claim 1 wherein said step of separating said combined channels at said second terminal is performed by at least one wavelength slicer.

5. A method for optical communications from a first terminal to a second terminal over a first optical fiber and a second optical fiber using wavelength division multiplexed (WDM) signals containing a plurality of channels, said method comprising:

monitoring the status of the said first optical fiber and said second optical fiber to define a normal state in which the first optical fiber is operating normally, a first fault state in which the first optical fiber has a fault, and a second fault state in which the second optical fiber has a fault;

in said normal state, routing a first set of channels over the first optical fiber and routing a second set of channels over the second optical fiber, wherein said first set of channels and said second set of channels are mutually exclusive;

in said first fault state:
 (a) combining said first set of channels and said second set of channels at the first terminal;
 (b) routing the combined channels over the second optical fiber to the second terminal; and
 (c) separating the combined channels into said first and second sets of channels at the second terminal; and in said second fault state:

(a) combining said first set of channels and said second set of channels at the first terminal;

(b) routing the combined channels over the first optical fiber to the second terminal; and (c) separating the combined channels into said first and second sets of channels at the second terminal.

6. The method of claim 5 wherein said first and second sets of channels are interdigitally spaced.

7. The method of claim 5 wherein said step of combining said first and second sets of channels at said first terminal in said fault states is performed by at least one wavelength slicer.

8. The method of claim 5 wherein said step of separating said combined channels at said second terminal in said fault states is performed by at least one wavelength slicer.

9. An optical communications system providing optical communications from a first terminal to a second terminal over at least a first optical fiber and a second optical fiber carrying wavelength division multiplexed (WDM) signals containing a first set of channels and a second set of channels, wherein said first and second sets of channels are mutually exclusive, and wherein said optical communications system comprises:

a controller monitoring the status of said first and second optical fibers, said controller defining a normal state in which both of said first and second optical fibers are operating normally, a first fault state in which the first optical fiber has a fault, and a second fault state in which the second optical fiber has a fault;

said first terminal having:

(a) a first multiplexer combining optical signals from a first input port and a second input port, wherein said first input port receives said first set of channels;

(b) a second multiplexer combining optical signals from a first input port and a second input port, wherein said second input port receives said second set of channels;

(c) a first optical switch selectively routing the combined optical signals from said first multiplexer to said first optical fiber in the normal state and the second fault state, and to said first input port of said second multiplexer in the first fault state; and (d) a second optical switch selectively routing the combined optical signals from said second multiplexer to said second optical fiber in the normal state and the first fault state, and to said second input port of said first multiplexer in the second fault state; and said second terminal having:

(a) a first demultiplexer separating optical signals from an input port into a first set of channels at a first output port and a second set of channels at a second output port;

(d) a second demultiplexer separating optical signals from an input port into a first set of channels at a first output port and a second set of channels at a second output port;

(c) a third optical switch selectively routing the channels from the first optical fiber to said input port of said first demultiplexer in the normal state and the second fault state, and selectively routing said first set of channels from said first output port of said second demultiplexer to said input port of said first demultiplexer in the first fault state; and (d) a fourth optical switch selectively routing the channels from the second optical fiber to said input port of said second demultiplexer in the normal state and the first fault state, and selectively routing said second set of channels from said second output port of said first demultiplexer to said input port of said second demultiplexer in said second fault state.

10. The optical communications system of claim 9 wherein said first and second sets of channels are interdigitally spaced.

11. The optical communications system of claim 9 wherein at least one of said first multiplexer, second multiplexer, first demultiplexer, and second demultiplexer comprise a wavelength slicer.

12. The optical communications system of claim 11 wherein said wavelength slicer comprises:

a first polarization-dependent routing element spatially separating an input beam containing a plurality of channels into a pair of orthogonally-polarized beams;

a polarization rotator for rotating the polarization of at least one of said pair of orthogonally-polarized beams to create first and second beams having the same polarization;

a wavelength filter coupled to receive said first and second beams from said polarization rotator, said wavelength filter having a polarization-dependent optical transmission function such that said first beam decomposes into third and fourth beams with their polarizations orthogonal to each other, and said second beam decomposes into fifth and sixth beams with their polarizations orthogonal to each other, wherein said third and fifth beams carry said first set of channels at a first polarization and said fourth and sixth beams carry said second set of channels at a second polarization, wherein said first and second polarizations are orthogonal; and a second polarization-dependent routing element spatially routing said third and fifth beams carrying said first set of channels along a first optical path and said fourth and sixth beams carrying said second set of channels along a second optical path based on their polarizations.

13. The optical communications system of claim 12 wherein said wavelength filter comprises a stacked plurality of birefringent waveplates with each waveplate oriented in a predetermined direction.

14. An optical communications system providing optical communications from a first terminal to a second terminal over a first optical fiber and a second optical fiber carrying wavelength division multiplexed (WDM) signals containing a first set of channels and a second set of channels that are interdigitally spaced between said first set of channels; said optical communications system comprising:

a controller monitoring the status of said first and second optical fibers, said controller defining a normal state in which both of said first and second optical fibers are operating normally, a first fault state in which the first optical fiber has a fault, and a second fault state in which the second optical fiber has a fault;

said first terminal having:

(a) a first wavelength slicer combining optical signals from a first input port and a second input port, wherein said first input port receives said first set of channels;

(b) a second wavelength slicer combining optical signals from a first input port and a second input port, wherein said second input port receives said second set of channels;

(c) a first optical switch selectively routing the combined optical signals from said first wavelength slicer to said first optical fiber in the normal state and the second fault state, and to said first input port of said second wavelength slicer in the first fault state; and (d) a second optical switch selectively routing the combined optical signals from said second wavelength slicer to said second optical fiber in the normal state and the first fault state, and to said second input port of said first wavelength slicer in the second fault state; and said second terminal having:

(a) a third wavelength slicer separating optical signals from an input port into a first set of channels at a first output port and a second set of channels at a second output port;

(d) a fourth wavelength slicer separating optical signals from an input port into a first set of channels at a first output port and a second set of channels at a second output port;

(c) a third optical switch selectively routing the channels from the first optical fiber to said input port of said third wavelength slicer in the normal state and the second fault state, and selectively routing said first set of channels from said first output port of said fourth wavelength slicer to said input port of said third wavelength slicer in the first fault state; and (d) a fourth optical switch selectively routing the channels from the second optical fiber to said input port of said fourth wavelength slicer in the normal state and the first fault state, and selectively routing said second set of channels from said second output port of said third wavelength slicer to said input port of said fourth wavelength slicer in said second fault state.

15. The optical communications system of claim 14 wherein at least one of said wavelength slicers comprise:

a first polarization-dependent routing element spatially separating an input beam containing a plurality of channels into a pair of orthogonally-polarized beams;

a polarization rotator for rotating the polarization of at least one of said pair of orthogonally-polarized beams to create first and second beams having the same polarization;

a wavelength filter coupled to receive said first and second beams from said polarization rotator, said wavelength filter having a polarization-dependent optical transmission function such that said first beam decomposes into third and fourth beams with their polarizations orthogonal to each other, and said second beam decomposes into fifth and sixth beams with their polarizations orthogonal to each other, wherein said third and fifth beams carry said first set of channels at a first polarization and said fourth and sixth beams carry said second set of channels at a second polarization, wherein said first and second polarizations are orthogonal; and a second polarization-dependent routing element spatially routing said third and fifth beams carrying said first set of channels along a first optical path and said fourth and sixth beams carrying said second set of channels along a second optical path based on their polarizations.

16. The optical communications system of claim 15 wherein said wavelength filter comprises a stacked plurality of birefringent waveplates with each waveplate oriented in a predetermined direction.

* * * * *